(12) United States Patent
Winkler et al.

(10) Patent No.: US 9,488,292 B2
(45) Date of Patent: Nov. 8, 2016

(54) DEVICE FOR COOLING A METERING VALVE

(71) Applicant: Robert Bosch GmbH, Stuttgart (DE)

(72) Inventors: Jochen Winkler, Esslingen (DE); Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 14/360,236

(22) PCT Filed: Nov. 8, 2012

(86) PCT No.: PCT/EP2012/072133
§ 371 (c)(1),
(2) Date: May 22, 2014

(87) PCT Pub. No.: WO2013/075950
PCT Pub. Date: May 30, 2013

(65) Prior Publication Data
US 2014/0299202 A1  Oct. 9, 2014

(30) Foreign Application Priority Data

Nov. 22, 2011  (DE) .................. 10 2011 086 795

(51) Int. Cl.
*F16K 49/00* (2006.01)
*F01N 3/00* (2006.01)
*F01N 3/20* (2006.01)

(52) U.S. Cl.
CPC ........... *F16K 49/005* (2013.01); *F01N 3/2066* (2013.01); *F01N 2260/024* (2013.01); *F01N 2610/02* (2013.01); *F01N 2610/11* (2013.01); *F01N 2610/1453* (2013.01); *Y02T 10/24* (2013.01); *Y10T 137/6579* (2015.04)

(58) Field of Classification Search
USPC .................. 137/339, 340; 239/132.3, 132.5
See application file for complete search history.

(56) References Cited

U.S. PATENT DOCUMENTS

| | | | | |
|---|---|---|---|---|
| 1,849,814 A | * | 3/1932 | Woodruff | F23D 11/36 239/132.3 |
| 2,041,694 A | * | 5/1936 | Buckley | F16K 31/52408 137/340 |
| 2,117,367 A | * | 5/1938 | Schlatter | F02M 53/043 239/132.3 |

(Continued)

FOREIGN PATENT DOCUMENTS

| | | |
|---|---|---|
| CN | 101103185 A | 1/2008 |
| CN | 101233303 A | 7/2008 |

(Continued)

OTHER PUBLICATIONS

International Search Report for Application No. PCT/EP2012/072133 dated Jan. 28, 2013 (English Translation, 2 pages).

*Primary Examiner* — Mary McManmon
*Assistant Examiner* — Jonathan Waddy
(74) *Attorney, Agent, or Firm* — Michael Best & Friedrich LLP

(57) ABSTRACT

The invention relates to a metering module (10) including a metering valve (12). The metering module further includes a cooling device through which a cooling fluid flows. Said cooling device comprises a first chamber (26) that has a cooling fluid inlet (42). The metering valve (12) has an additional cooling member (36) containing a second chamber (52) which is hydraulically connected to the first chamber (26) via at least one opening (50).

16 Claims, 5 Drawing Sheets

(56) References Cited

U.S. PATENT DOCUMENTS

| | | | | |
|---|---|---|---|---|
| 2,297,421 A * | 9/1942 | Lorenz | F02M 53/043 | 239/132.3 |
| 2,556,356 A * | 6/1951 | Alfaro | F02M 47/00 | 239/132 |
| 4,094,465 A * | 6/1978 | Bastenhof | F02M 61/16 | 239/132.3 |
| 5,467,925 A * | 11/1995 | Riano | F23D 11/36 | 239/132.3 |
| 6,526,746 B1 * | 3/2003 | Wu | F01N 3/2066 | 239/585.1 |
| 6,539,708 B1 * | 4/2003 | Hofmann | B01D 53/8631 | 239/132.3 |
| 2006/0108443 A1 | 5/2006 | Huffman et al. | | |
| 2010/0307161 A1 * | 12/2010 | Thomson | F23D 11/107 | 60/748 |
| 2010/0320285 A1 * | 12/2010 | Haeberer | F01N 3/2066 | 239/132 |
| 2011/0192140 A1 * | 8/2011 | Olivier | F01N 3/2066 | 60/274 |
| 2011/0266370 A1 * | 11/2011 | Roessle | F01N 3/2066 | 239/459 |
| 2012/0074243 A1 * | 3/2012 | Prociw | F01N 3/36 | 239/533.2 |
| 2014/0311130 A1 * | 10/2014 | Knittel | F01N 3/2066 | 60/285 |
| 2015/0093302 A1 * | 4/2015 | Pohl | F01N 3/2066 | 422/310 |

FOREIGN PATENT DOCUMENTS

| | | |
|---|---|---|
| CN | 101346535 A | 1/2009 |
| CN | 101506482 A | 8/2009 |
| DE | 4436397 | 4/1996 |
| DE | 102005061145 | 6/2007 |
| DE | 102009047375 | 6/2011 |
| EP | 2503122 | 9/2012 |
| JP | 2007321647 | 12/2007 |
| JP | 2008255910 | 10/2008 |
| WO | 2012136789 A1 | 10/2012 |
| WO | 2013068288 | 5/2013 |

* cited by examiner

DEVICE FOR COOLING A METERING VALVE

BACKGROUND OF THE INVENTION

The invention relates to a device for cooling a metering module, in particular for metering a reducing agent, such as urea or a urea/water solution, into the exhaust gas section of an internal combustion engine.

DE 44 36 397 A1 relates to a device for the aftertreatment of exhaust gases. A device for the aftertreatment of exhaust gases of a compression-ignition internal combustion engine is disclosed, in which device a reducing agent is fed into the exhaust gas which is supplied to a reducing catalytic converter in order to improve the functioning of the catalytic converter. Here, the feeding of the reducing agent takes place via an electrically controlled metering valve which is arranged in a common housing with a control valve. The control valve serves for the controlled introduction of fed compressed air, during which introduction a quantity of reducing agent which is advanced via the metering valve is prepared and is introduced intermittently into the exhaust gas. Said intermittent introduction serves, in particular, to avoid urea deposits and to avoid agglutinations on the metering valve and control valve in addition to the optimum preparation of the introduced reducing agent.

The subject matter of US 2006 0108443 A1 is a lance-shaped spraying device for a reducing agent for lowering the NOx emissions. The spraying device comprises a line for a reducing agent, in particular a urea/water solution, which line is surrounded by an atomizer line. The atomizer line is surrounded by a tubular cooling housing which forms a jacket-shaped liquid cooling chamber. The liquid cooling chamber of jacket-shaped configuration extends over a considerable length section of the atomizer line. Liquid is fed to the liquid cooling chamber via an inlet and is discharged again via an outlet. The inlet and the outlet lie at an end of the spraying device, which end is remote from the exhaust gas pipe. The inlet has an extension pipe, with the result that the cooling liquid enters into the liquid cooling chamber at a location between the inlet and the injection end.

DE 10 2009 047 375 A1 discloses a metering module, in which a metering valve is included for metering urea into the exhaust gas section of an internal combustion engine. In order for the valve tip of the metering valve to be as close as possible to the exhaust gas flow, the valve seat for the metering valve is cooled actively in the metering module. Here, the metering module is assigned a cooling device which encloses a circumferential face of the metering module and is flowed through by a cooling liquid, a cooling fluid. This is, for example, cooling fluid which is removed from the cooling fluid circuit of a vehicle. Despite the relative proximity of the metering valve to the exhaust gas flow, the temperature in the vicinity of the outlet opening, that is to say the injection opening for the reducing agent into the exhaust gas section, does not rise above 120° C.

DE 10 2005 061 145 A1 discloses an exhaust gas aftertreatment device for the aftertreatment of exhaust gas in an exhaust gas system of an internal combustion engine. The exhaust gas aftertreatment device comprises a metering valve which is flange-connected to an exhaust gas pipe. The flange protrudes laterally at an angle from the circumferential face of the exhaust gas pipe, with the result that the heat-sensitive valve tip of the metering module is spaced apart somewhat from the exhaust gas flow. For the discharge of heat, the metering valve according to this solution is surrounded in regions by cooling fins which are produced from a material which has a high thermal conductivity. In the case of passive cooling which is shown here by way of cooling fins, more advantageous closer positioning of the metering valve in relation to the exhaust gas duct is not possible for reasons of space.

SUMMARY OF THE INVENTION

It is proposed according to the invention to equip a metering module, which comprises a metering valve, with a cooling device, the cooling device itself being flowed through by a cooling fluid and the cooling device having at least two chambers which are connected to one another. Either the cooling fluid which circulates in the cooling circuit of an internal combustion engine or a discrete cooling fluid which is separated from the former cooling fluid and can circulate in a separate cooling circuit may be suitable as cooling fluid. Said at least two chambers comprise a first chamber which is assigned to an end region of the metering valve and a second chamber which is assigned to a center region of the metering valve. The cooling fluid preferably flows through the two chambers one after another. The first chamber is situated in the region of the metering valve which is installed in the exhaust gas section of the internal combustion engine, and at which the highest temperatures occur on account of the very close proximity to the exhaust gas section. The second chamber is situated in the center region of the metering valve and, for example, cools an electrical contact point, at which contact is made with a magnet coil of the electrically actuated metering valve, ruling out an electrical short circuit.

If, on its path, the cooling fluid flows through both of the at least two chambers which are provided hydraulically with respect to one another, the valve tip is cooled in an optimum way during the flow through the first chamber and very high thermal loadings which occur there, since the cooling fluid enters at its lowest temperature in relative terms into the first chamber according to this throughflow sequence. As a result, optimum cooling of the valve tip region of the metering valve is achieved. Afterward, the cooling fluid passes into the second chamber which is connected hydraulically to the first chamber and in which cooling of further sensitive regions takes place, in particular within an electrical plug region and/or in the coil region of the metering valve. In principle, there is also the possibility of providing a throughflow of the at least two said chambers in the reverse direction. In the case of a throughflow of the at least two chambers of the cooling device by the cooling fluid in the reverse direction, it is to be taken into consideration that the most effective cooling is achieved in the plug region and/or in the coil region of the metering valve in this throughflow direction, since the cooling fluid enters there at its lowest temperature in relative terms, whereas the thermally particularly heavily loaded tip region of the metering valve can be cooled to a less pronounced extent.

During operation, the temperature in the exhaust gas pipe of the exhaust gas section lies in a typical range between 200° C. and 850° C.

The valve tip, that is to say that region of the metering valve at which the reducing agent exits into the exhaust gas section, is produced from a material with poor thermal conductivity, preferably a steel, which has high thermal resistance, high chemical resistance, in particular with respect to a reducing agent such as AdBlue® and secondary products, and, furthermore, high chemical resistance to exhaust gas condensate. Furthermore, the material from which the valve tip is preferably manufactured is distinguished by satisfactory welding properties and satisfactory workability.

The end which is cooled actively by means of the cooling fluid, that is to say the valve tip of the metering valve, comprises a valve tip region, at which the reducing agent exits in a manner which is preferably atomized as a urea/air mixture or a urea/water solution mixed with compressed air, in order to pass into the exhaust gas pipe of the exhaust gas section of the internal combustion engine. Moreover, following the solution which is proposed according to the invention, the center region of the metering valve, that is to say the region of the metering valve in which the magnet coil for actuating the metering valve and the electrical plug outlet are situated, is cooled with the cooling fluid. The center region of the metering valve can comprise a region which can be configured as a pipe section for the injection of the reducing agent, in particular urea or a urea/water solution, into the exhaust gas duct, and can also have regions which are connected functionally to the feed line of the reducing agent, for example a region in which the electric contact means also lies.

The valve tip region of the metering valve can advantageously be spaced apart from the flow within the flow pipe, with the result that the valve tip region is not exposed directly to the highest temperature which occurs in the flow direction. In one preferred design variant of the solution which is proposed according to the invention, one of the two chambers which are flowed through by the cooling fluid comprises a region, in which an electric plug contact for the electrical actuation of the magnet coil of the metering valve is situated. By way of the solution which is proposed according to the invention, the plug region of the metering valve is cooled by way of the provision of the second chamber which is flowed through by the cooling fluid, with the result that a metering module can be used even at relatively high ambient temperatures. This is interesting, in particular, when the metering module with the metering valve is not installed into the underbody of the vehicle, but rather is arranged, for example, in the engine compartment of a vehicle, in which relatively high temperatures can occur which, as a result of the solution which is proposed according to the invention, do not lead to an impairment of the function and the service life of the metering valve, however. The electrical plug connection can be damaged at temperatures over 160° C. and electrical contact failures are to be expected if cooling is not present. This is allowed for by virtue of the fact that active cooling is ensured around the electrical plug region on account of the arrangement of the second cooling chamber in the center region of the metering valve and that there is permanent reliable electrical contact even at high ambient temperatures.

The device which is proposed according to the invention can advantageously be used at ambient temperatures of greater than 160° C., since the electrical plug connection and the magnet coil of the metering valve are not damaged at temperatures of this type, whereas failure of the valve and/or the electrical contact would have to be expected at this temperature in devices which are known from the prior art. The cooling device which is proposed according to the invention therefore makes it possible to use the metering module in surroundings in which high temperatures prevail, such as the engine compartment of a vehicle which has already been mentioned in the above text. In a further advantageous embodiment of the solution which is proposed according to the invention, the second cooling chamber which is situated in the center region of the metering valve comprises a region, in which a magnet coil of the metering valve is arranged. The magnet coil is loaded to a very pronounced extent during operation of the metering valve and is particularly exposed to material fatigue. The magnet coil for actuating the metering valve represents a sensitive component of the metering device, the failure of which is made allowance for by way of the provision which is proposed according to the invention of the second cooling chamber in the region of the magnet coil of the metering valve.

The at least one first and one second chamber which are flowed through by the cooling fluid can be connected hydraulically to one another by way of one or more passage openings. The passage openings lie on mutually adjacent ceilings or bottom faces of the two chambers which for their part are preferably connected by way of a material-to-material connection. In particular, laser welding along the contact faces of said regions of the two chambers which are to be joined to one another in a material-to-material manner or their adjoining components is suitable. The configuration of a material-to-material connection as a laser weld represents a particularly inexpensive implementation. The chambers which are flowed through by the cooling fluid can expediently be manufactured as deep-drawn components and/or bent parts. Moreover, there is the possibility to completely cover the device which is proposed according to the invention, since the retained air cannot reach the sensitive components.

Further advantageous properties of the solution which is proposed according to the invention which are to be mentioned are that it is the development of an existing product, with the result that existing components and manufacturing devices merely have to be modified slightly and can substantially be used further, which represents a not inconsiderable manufacturing cost advantage. Furthermore, it is to be mentioned as an advantage that there is the possibility by way of the solution which is proposed according to the invention to design cooling fluid inlets to be axial or at least approximately axial. As a result, an advantage in terms of installation space in relation to the radial installation direction can be achieved, with the result that customers can be served, where only restricted amounts of installation space are available for the solutions thereof.

BRIEF DESCRIPTION OF THE DRAWINGS

In the following text, the invention will be described in greater detail using the drawing, in which.

DETAILED DESCRIPTION

Figure 1:
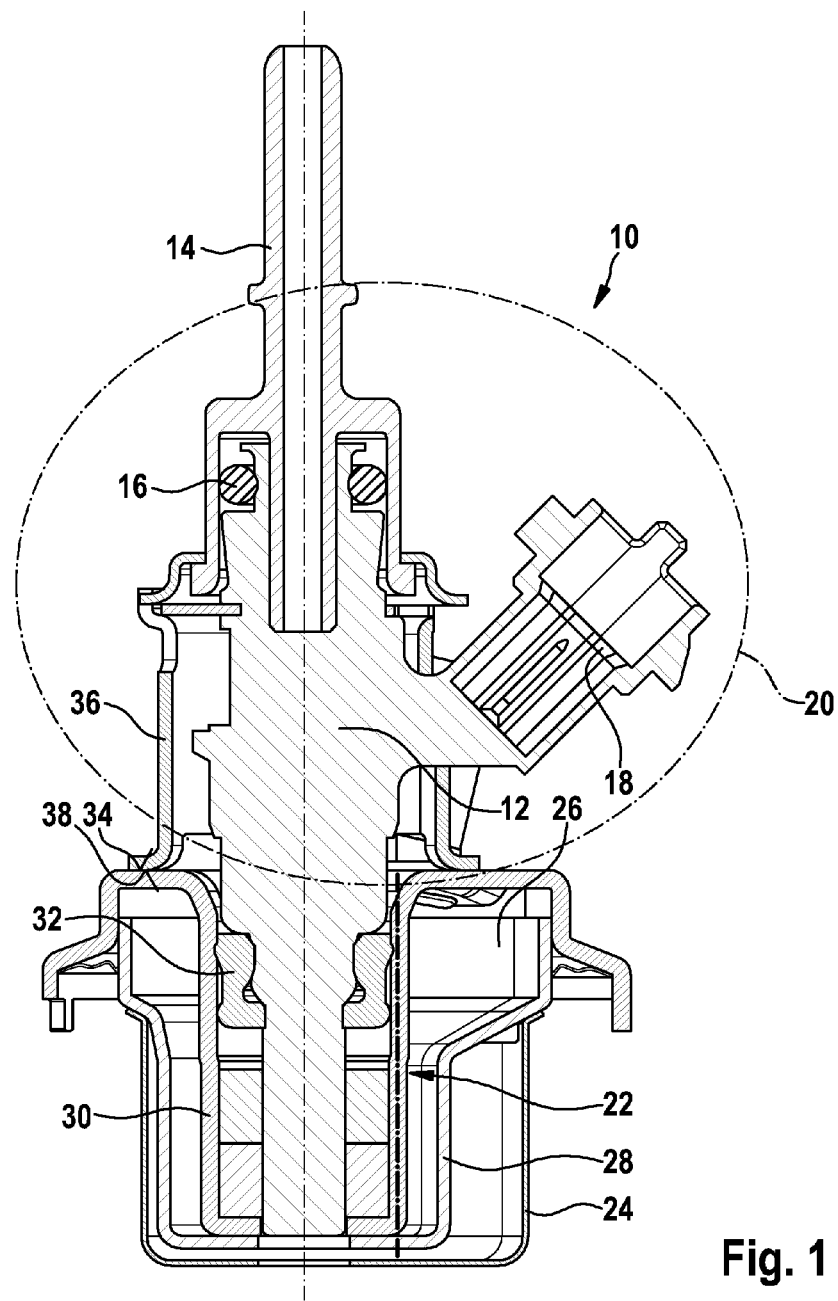
FIG. 1 shows a metering module with a metering valve with indicated cooled and non-cooled regions.

A section through a metering module with a metering valve which has a region which is cooled by cooling fluid in the lower region and a non-cooled region in the center region can be gathered from the illustration according to FIG. 1.

The sectional illustration according to FIG. 1 shows a metering module 10, in which a meter valve 12 is received. The metering module 10 is loaded with a reducing agent via a reducing agent feed 14 which extends in the perpendicular direction in the vertical direction from above onto the metering module 10. The reducing agent is preferably a reducing agent such as urea or a urea/water solution, also known under the commercial name AdBlue®. Instead of the substantially perpendicularly configured reducing agent feed which is shown in FIG. 1, it can also have a course which is angled away by 90° or, instead of the one reducing agent feed 14 which is shown here, a plurality of reducing agent feeds 14 can be configured. The metering valve 12 of the metering device 10 is sealed via a sealing ring 16. A plug output of an electrical plug contact 18 is situated on the side of the metering module 10.

As is apparent from the illustration according to FIG. 1, merely the lower region of the metering valve is cooled in this design variant of the metering module 10 (cf. position 22) and the center region of the metering valve 12 of the metering device marks a non-cooled region 20.

FIG. 1 shows that the metering device 10 comprises a cup 24 in the cooled region 22. The cup 24 encloses an insert part 28. The latter is in turn covered by a covering part 30 which, together with the insert part 28, defines a first chamber 26 which is loaded by the cooling fluid, for example the cooling fluid which circulates in the cooling circuit of the internal combustion engine. It is apparent from the illustration according to FIG. 1 that the lower region of narrow configuration of the metering valve 12 is centered by a centering means or a supporting part 32 in the covering part 30. The valve tip of the metering valve 12, that is to say the thermally most highly loaded point of the metering valve 12, is situated at the lower end of the metering valve 12, that is to say penetrating the bottom of the covering part 30 and the bottom of the insert part 28 and the cup 24, at which point the reducing agent is injected into the exhaust gas flow in the exhaust gas section of the internal combustion engine, in particular as a finely atomized droplet mist, either urea or a urea/water solution.

Moreover, it is apparent from the illustration according to FIG. 1 that an additional cooling element 36 is situated in the non-cooled region 20. The additional cooling element 36 which is situated in the center part of the metering valve 12 and the covering part 30 which has a cover face 34 are connected to one another in a material-to-material manner along a contact face 38. A laser weld which can be produced very simply and very inexpensively in mass production has proven itself as a material-to-material connection. The material-to-material connection may also be a brazed connection or a soldered connection.

Figure 2:
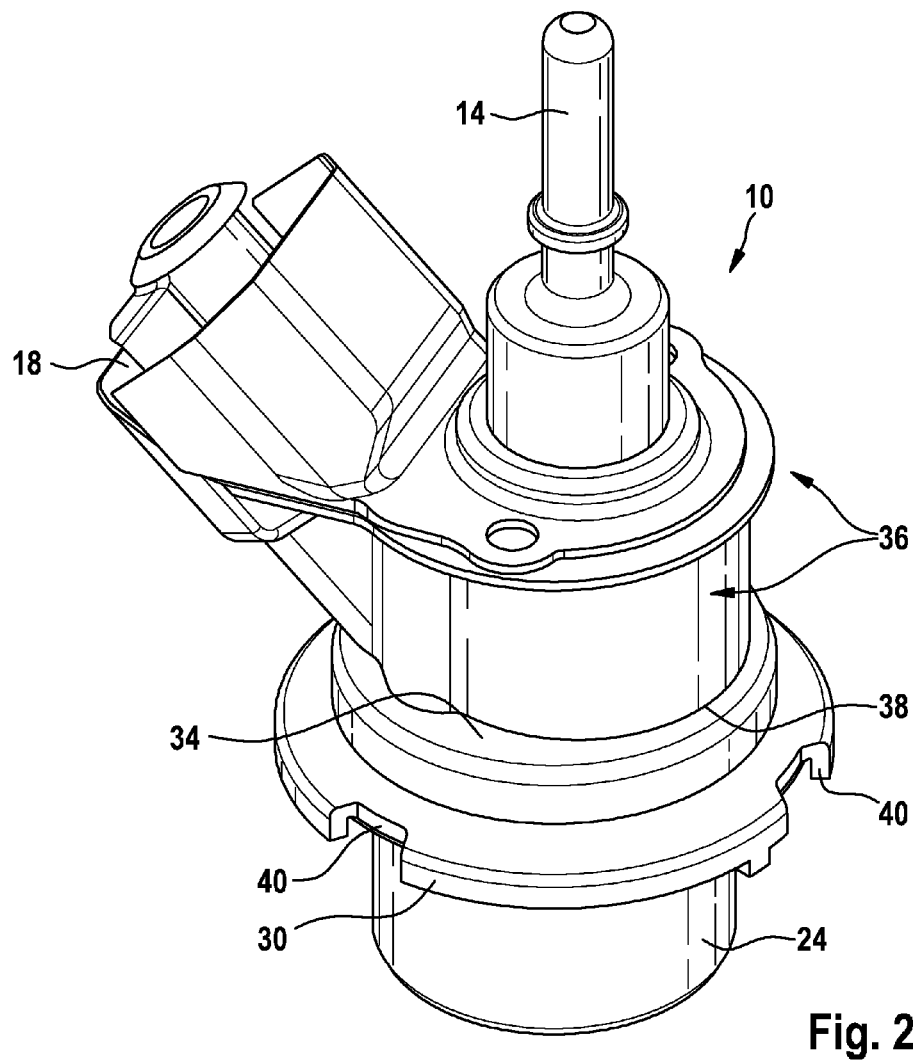
FIG. 2 shows a perspective view of a metering module.

FIG. 2 shows a perspective plan view of a metering module.

The metering module 10 according to the perspective plan view in FIG. 2 shows the reducing agent feed 14 which extends substantially in a vertical direction and a lateral plug output 18, below which the additional cooling element 36 is situated which will be described in yet further detail in the following text using the following figures. The additional cooling element 36 and the covering part 30 on the cover face 34 which is configured as a planar face are connected in a material-to-material and tight manner to one another along the contact face 38. It arises from the perspective plan view according to FIG. 2 that positioning recesses 40 are situated on the circumferential collar of the covering part 30, which positioning recesses 40 serve to align the metering module 10 which is proposed according to the invention during its mounting in the exhaust gas section of an internal combustion engine. The positioning recesses 40 advantageously serve to mount the metering module 10 in the field of trucks. The fastening of the metering module 10 to trucks takes place by means of a screw flange, the positioning recesses 40 providing the necessary space for the fastening screws.

Figure 3:
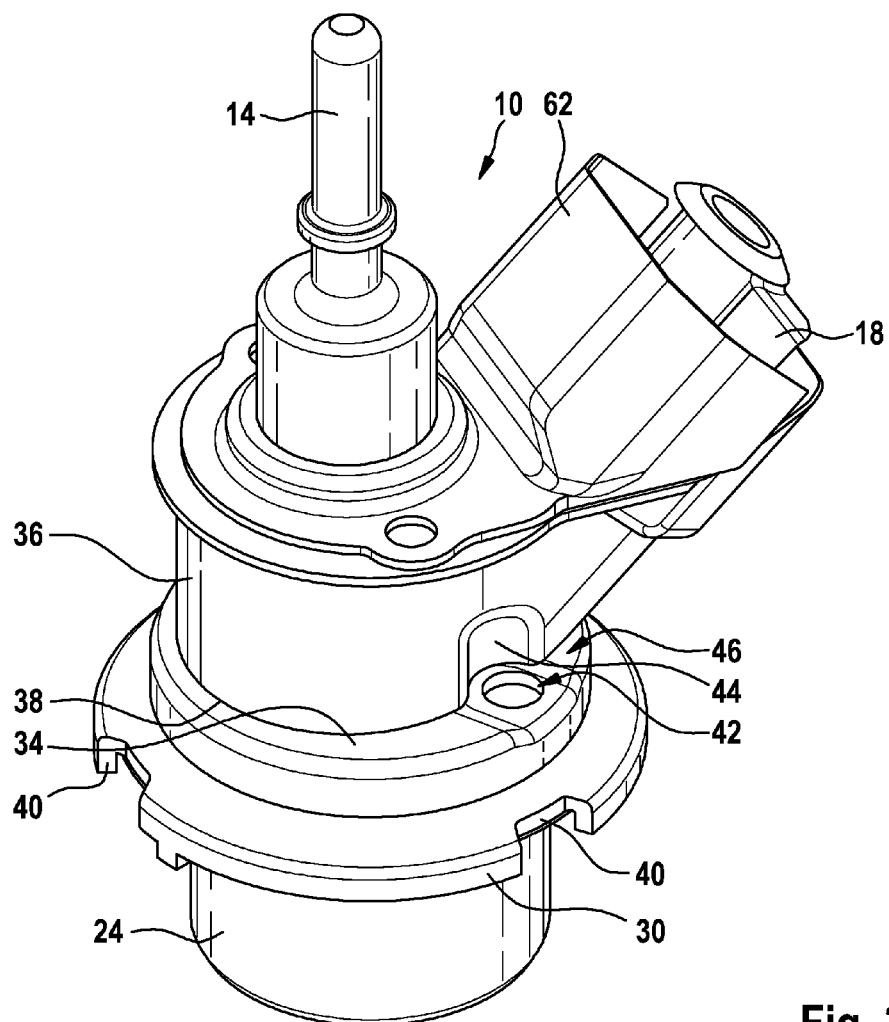
FIG. 3 shows a metering module with a second cooling body which is arranged in the center region of the metering module, and with a cooling fluid inlet.

It can be gathered from the illustration according to FIG. 3 that an inlet opening for a cooling fluid (cf. position 42) is situated in the cover face 34 of the collar of the covering part 30. In order to facilitate the connection of a line which conducts cooling fluid, the circumferential face of the additional cooling element 36 has a type of indentation 44, in order to provide the necessary installation space for a connector stub or for a connector hose, with the result that the connection work can be handled more simply. In addition, it emerges from FIG. 3 that the electrical plug contact 18 is covered by a protective cap 62. Since the cover face 34 of the covering part 30 is configured as a planar face 46, the cooling fluid inlet 42 is also configured so as to run in a planar manner. The cup 24 which surrounds both the insert part 28 and the covering part 30 is situated below the collar of the covering part 38, in which the positioning recesses 40 are provided.

Figure 4:
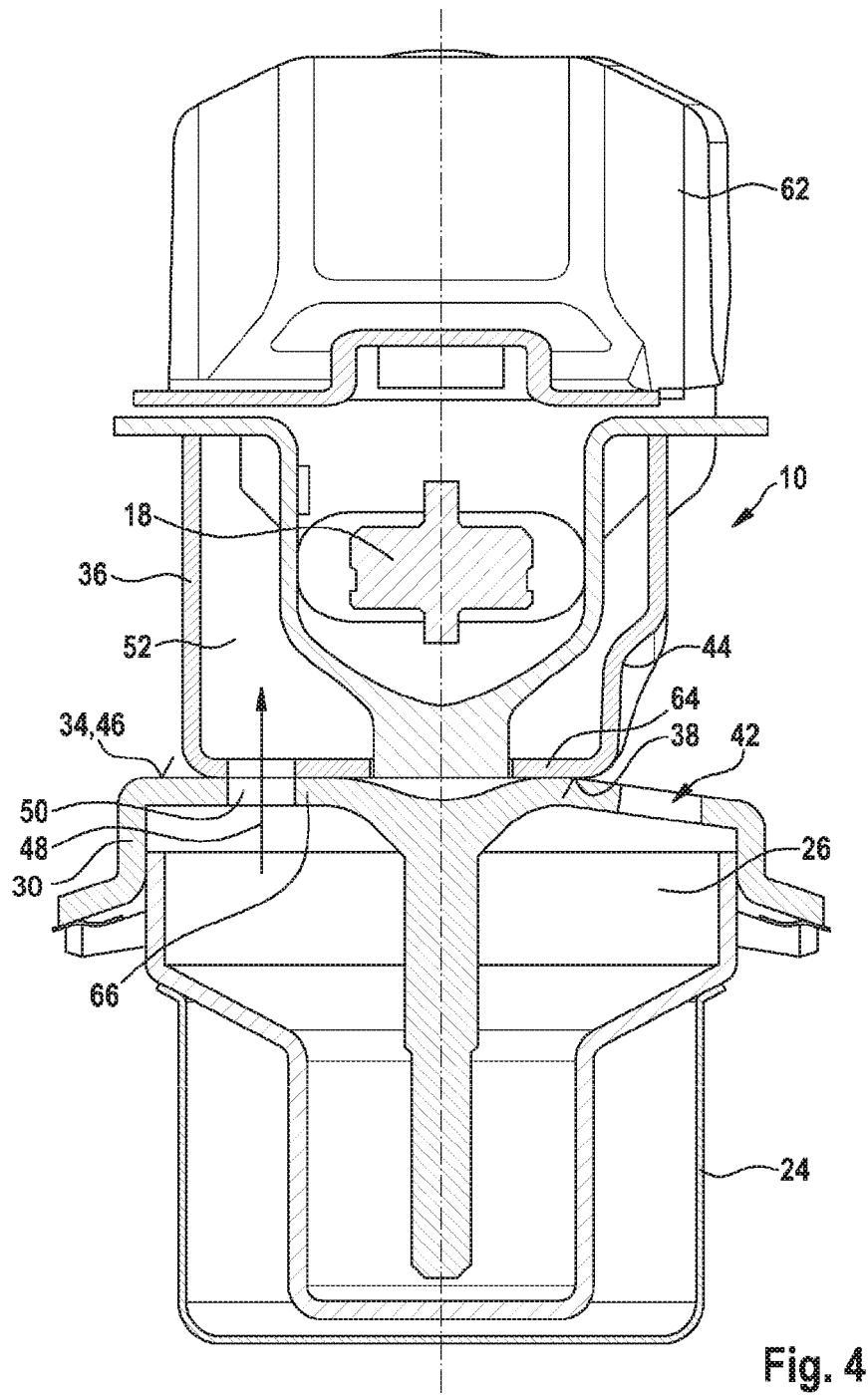
FIG. 4 shows an illustration of passage openings between the first chamber which is loaded by the cooling fluid and a second chamber which is arranged above the former and is loaded by the cooling fluid.

FIG. 4 shows the metering module 10 from another position which is rotated by 90° in comparison with the above figures. It is apparent from the illustration according to FIG. 4 that the metering module 10 comprises the additional cooling element 36 which is in a hydraulic connection via at least one opening for the passage of the cooling fluid with the first chamber 26 which is formed by the covering part 30, that is to say at least one opening 50, with the result that cooling fluid can flow over from the first chamber 26 which is situated in the lower part of the metering device 10 via the at least one opening 50 into a second chamber 52 which is formed in the additional cooling element 36.

As is apparent from the sectional illustration according to FIG. 4, the additional cooling element 36 is situated above the covering part 30, in particular on its cover face which is configured as a planar face 46. The covering part 30 and the additional cooling element 36 are connected sealingly to one another by way of a material-to-material connection 38 which is preferably configured as a laser weld. FIG. 4 shows that the first chamber 26 which is delimited by the insert part 28 and by the covering part 30 and the second chamber 52 which is situated in the additional cooling element 36 are connected via at least one opening 50. Cooling fluid flows in the crossflow direction 48 from the first chamber 26 into the second chamber 52 through said at least one opening 50 which is formed firstly in the lid part 66 and is situated secondly in the bottom part 64 of the additional cooling element 36. Furthermore, the opening 42 for the inlet of cooling fluid is situated in the planar face 64 of the lid part 66 of the covering part 30. As has already been mentioned in the above text, the cooling fluid which first of all enters into the first chamber 26 can be both the cooling fluid which circulates in the cooling circuit of the internal combustion engine and a cooling fluid which is stored separately and circulates in a separate circulation circuit.

It is to be mentioned for the sake of completeness that the insert part 28 is surrounded by a cup 24, just like the electrical plug contact 18 which is enclosed by a protective cap 62 which can be manufactured from rubber or from a plastic material.

Figure 5:
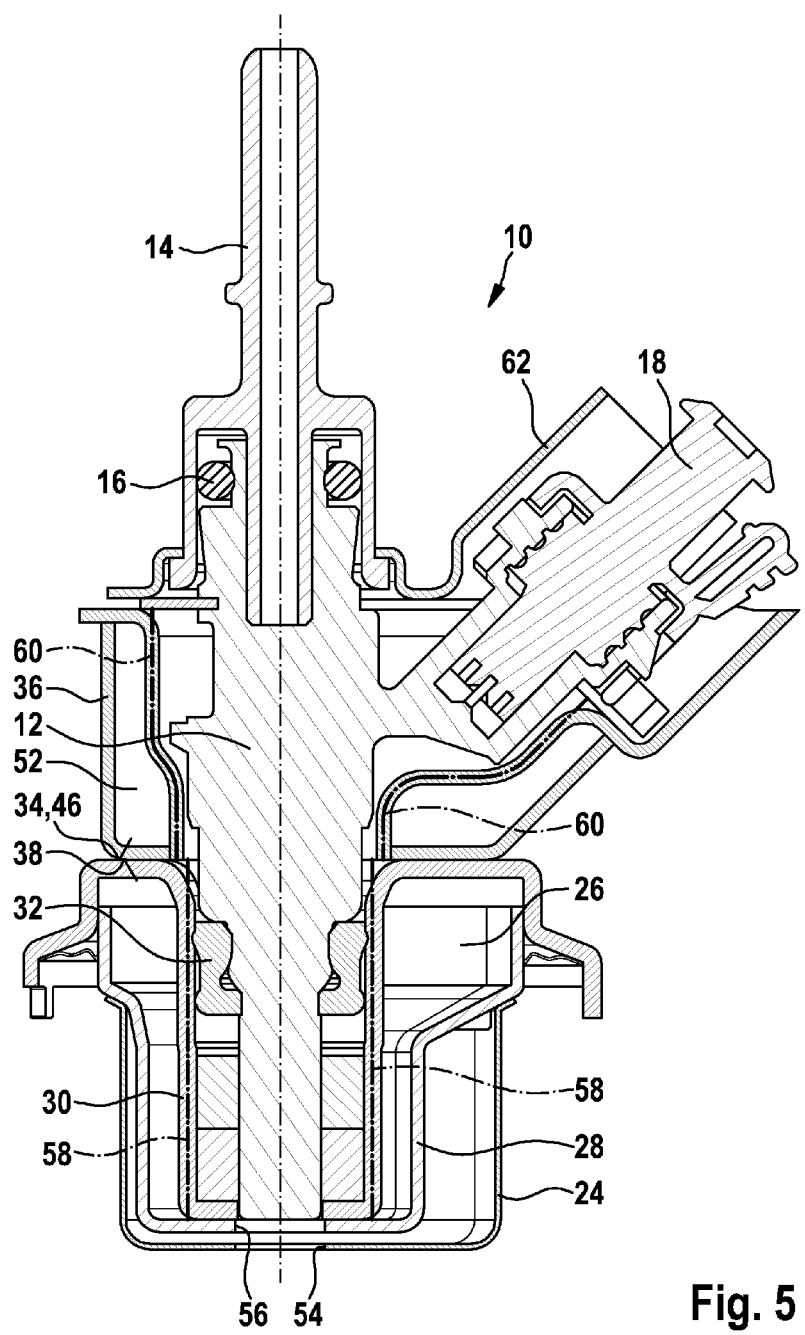
FIG. 5 shows a sectional illustration through a metering module with indicated cooled surfaces, and a section through the first chamber which is flowed through by cooling fluid and a second chamber which is flowed through by cooling fluid.

The metering module is apparent in longitudinal section from the illustration according to FIG. 5.

The metering valve 12 of the metering module 10 is loaded with reducing agent, whether urea or whether urea/water solution (also known under the name AdBlue®), via the reducing agent feed 14 which enters perpendicularly in the vertical direction from above into the body of the metering valve 12. An electrical plug contact 18 which is enclosed by the abovementioned protective cap 62 is situated on the side of the metering valve 12. The reducing agent feed 14 is sealed by way of a sealing ring 16 which is situated above the metering valve 12. FIG. 5 shows that the additional cooling element 36 is connected in a material-to-material manner to the cover face 34 of the covering part 30 along a contact face 38. In the sectional plane which is shown in FIG. 5, the at least one opening 50 which connects the first chamber 26 and the second chamber 52 in the additional cooling element 36 to one another hydraulically is not shown. Cooling fluid which is flowing in via the cooling fluid inlet (not shown in FIG. 5) into the first chamber 26 which is formed by the insert part 28 and the covering part 30 cools the cooled surfaces of the sleeve-shaped projection of the covering part 30 which are denoted by designation 58 and extend parallel to the shank of tapered configuration of the metering valve 12. The centering means or a supporting part 32 which centers and seals the valve tip of the metering valve 12 in the covering part 30, which valve tip extends downward in the vertical direction, is made in the interior of the covering part 30. The end side of the metering valve 12 protrudes through an opening 56 of the insert part 28 and through an opening 54 which is situated in the cup 24 into the exhaust gas section (not shown in FIG. 5) of the internal combustion engine, which exhaust gas section is flowed through by the very hot exhaust gases, containing NOx components, of the internal combustion engine.

From the first chamber 26, the cooling fluid which is now heated on account of cooling the cooled face 58 flows over via the at least one opening 50 (shown in the sectional illustration according to FIG. 4) into the second chamber 52 which is situated above the first chamber 26 in the additional cooling element 36. Here, the surfaces which are denoted by designation 60 are cooled, with the result that a cooling action is produced in the middle region of the metering valve 10, in particular in the region of the electrical plug contact 18 which is surrounded by the protective cap 62. The limiting of the temperatures in the region of the electrical plug contact 18 to a temperature level of 160° C. can be achieved by way of the second chamber 52 which is proposed according to the invention and is situated in the additional cooling element 36. This means that failure phenomena are ruled out in the region of the electrical plug contact 18 on account of the cooling in the middle region of the metering valve 12 of the metering module 10, which cooling is ensured by way of the solution which is proposed according to the invention, since more effective cooling can be achieved by way of the cooling fluid compared, for example, with air gap insulation.

FIG. 5 shows that the additional cooling element 36 is seated with its bottom face 64 in a planar manner on the planar face 46 of the cover face 34 of the covering part 30, as a result of which a satisfactory heat transfer is ensured between said two components, that is to say in the additional cooling element 36 and the covering part 30. Said parts, that is to say the additional cooling element 36 and the covering part 30, can be manufactured particularly simply in terms of manufacturing technology as deep-drawn parts. The material-to-material connection which connects said components, that is to say the additional cooling element 36 and the covering part 30, is preferably configured as a circumferential laser welded seam along the contact face 38 in the circumferential direction between said components. This method has proven particularly inexpensive and efficient on a mass production scale.

Complete cooling of the metering module 10 can be achieved by way of the solution which is proposed according to the invention. The region which is exposed to the highest thermal loadings can advantageously be realized by way of filling of the first chamber 26 with cooling fluid which has a relatively low temperature. The electrical contact region 18 can be cooled by the additional cooling element 36 which contains the second cooling chamber 52, with the result that the reliable function of said electrical contact region 18 is ensured even in the case of a relatively high ambient temperature level. This in turn makes it possible to arrange the metering device 10 which is proposed according to the invention not only in the underbody region of the vehicle, that is to say in the immediate vicinity of the exhaust gas system, but rather also to install it in the engine compartment of a vehicle depending on the design requirements and OEM requirements. The temperature of the electrical contact means 18 can be controlled by way of the complete cooling of the metering device 10, in particular by way of the second chamber 52 of the additional cooling element 36 in the center region of the metering valve 12, with the result that failure of the electrical contact means is ruled out.

What is claimed is:

1. A metering device (10) comprising a metering valve (12) through which a reducing agent flows and a cooling device through which a cooling fluid flows, the metering valve (12) including a center region and a lower region having a valve tip configured to spray the reducing agent into an exhaust gas pipe, the cooling device including an insert part (28) and a covering part (30) which covers the insert part (28), wherein the covering part (30) generally surrounds the lower region of the metering valve (12) and the insert part (28) generally surrounds the covering part (30), wherein the cooling device further includes at least one first chamber (26) defined between the insert part (28) and the covering part (30), the at least one first chamber (26) having a cooling fluid inlet (42) situated in a cover face (34) of the covering part (30) for receiving the cooling fluid, wherein the metering device (10) has an additional cooling element (36) which includes a second chamber (52) and which is connected hydraulically to the first chamber (26) via at least one opening (50), wherein the second chamber (52) generally surrounds the center region, and wherein the cooling fluid flows from the first chamber (26) into the second chamber (52) through the at least one opening (50).

2. The metering device (10) as claimed in claim 1, characterized in that the cooling fluid flows from the first chamber (26) into the second chamber (52) in a direction generally opposite to the flow of the reducing agent through the metering valve (12).

3. The metering device (10) as claimed in claim 1, characterized in that the additional cooling element (36) encloses the center region of the metering valve (12).

4. The metering device (10) as claimed in claim 1, characterized in that an indentation (44) for simplifying assembly is formed on the additional cooling element (36) in a vicinity of the cooling fluid inlet (42).

5. The metering device (10) as claimed in claim 1, characterized in that the cooling fluid inlet (42) is made axially.

6. The metering device (10) as claimed in claim 1, characterized in that the additional cooling element (36) is connected to the covering part (30).

7. The metering device (10) as claimed in claim 6, characterized in that a material-to-material connection (38) is formed between the additional cooling element (36) and a planar face (46) of the covering part (30).

8. The metering device (10) as claimed in claim 7, characterized in that the material-to-material connection is a laser welded connection.

9. The metering device (10) as claimed in claim 7, characterized in that the material-to-material connection is a brazed connection or as a soldered connection.

10. The metering device (10) as claimed in claim 1, characterized in that the additional cooling element (36) is supported in a planar manner by way of a base on the cover face (34) of the covering part (30), the cover face (34) is configured as a planar face (46).

11. The metering device (10) as claimed in claim 1, characterized in that the metering valve (12) is supported in the covering part (30) by a centering means or a supporting part (32).

12. The metering device (10) as claimed in claim 1, characterized in that the at least one opening (50) which connects the first chamber (26) and the second chamber (52) to one another hydraulically extends through a bottom part (64) of the additional cooling element (36) and through a lid part (66) of the cover face (34) of the covering part (30).

13. The metering device (10) as claimed in claim 1, wherein an electrical contact (18) is situated in the center region of the metering valve (12), and wherein the additional cooling element (36) encloses the electrical contact (18).

14. The metering device (10) as claimed in claim 1, wherein the insert part (28) and the covering part (30) each include an aperture positioned adjacent the valve tip such that each aperture communicates with the exhaust gas pipe, and wherein the valve tip extends at least into the aperture of the covering part (30).

15. The metering device (10) as claimed in claim 1, wherein the metering device (10) further comprises a cup (24), and wherein the cup (24) generally surrounds and encloses the insert part (28).

16. The metering device (10) as claimed in claim 15, wherein the insert part (28), the covering part (30), and the cup (24) each include an aperture positioned adjacent the valve tip such that each aperture communicates with the exhaust gas pipe, and wherein the valve tip extends at least into the aperture of the covering part (30).

* * * * *